July 31, 1962 M. G. KELLY 3,047,835
LEAD-OFF SPLICE BLOCK FOR CONTINUOUS AND OTHER CABLES
Filed Sept. 19, 1960 3 Sheets-Sheet 1
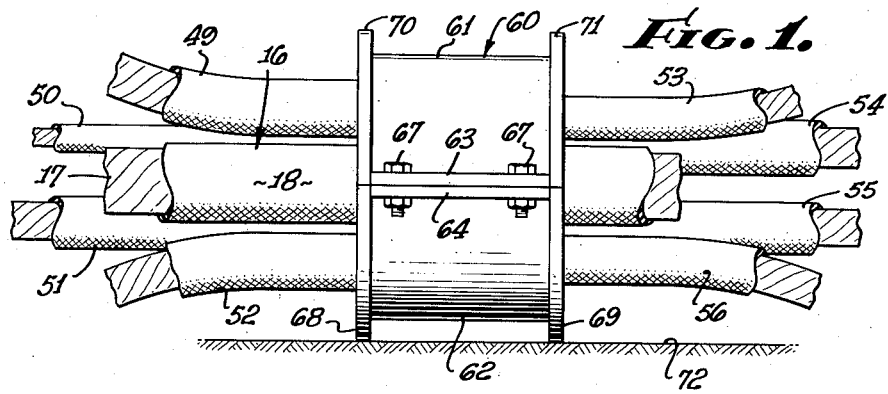
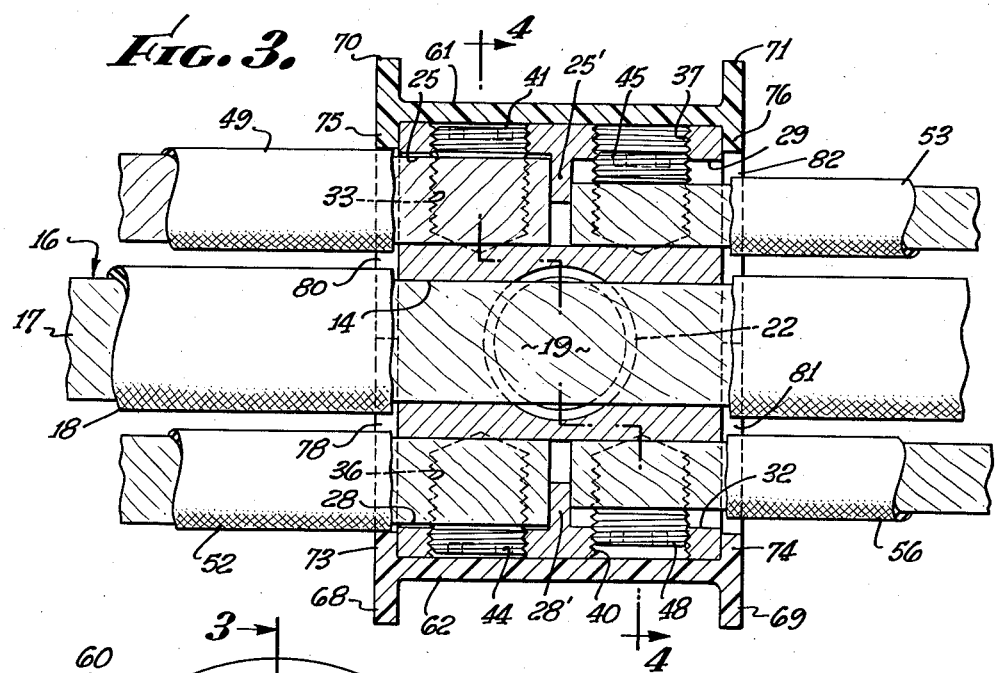
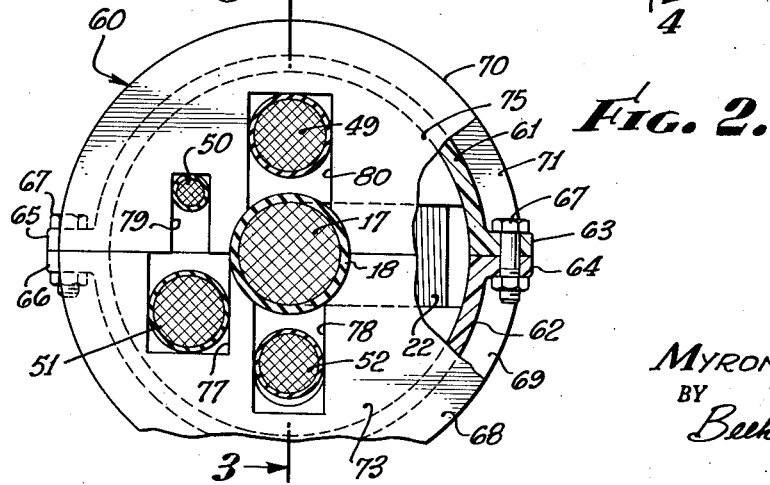
INVENTOR.
MYRON G. KELLY
BY
Beehler & Shanahan
ATTORNEYS.

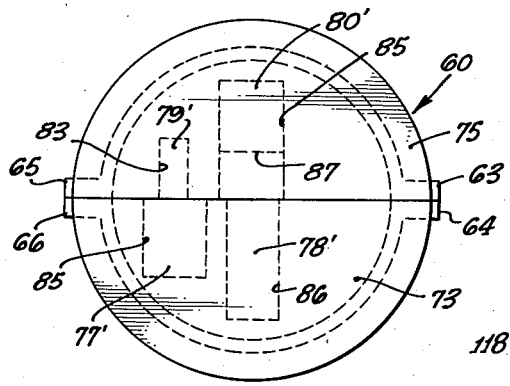

July 31, 1962 — M. G. KELLY — 3,047,835
LEAD-OFF SPLICE BLOCK FOR CONTINUOUS AND OTHER CABLES
Filed Sept. 19, 1960 — 3 Sheets-Sheet 3

INVENTOR.
MYRON G. KELLY
BY Beehler & Shanahan,
ATTORNEYS

United States Patent Office 3,047,835
Patented July 31, 1962

3,047,835
LEAD-OFF SPLICE BLOCK FOR CONTINUOUS AND OTHER CABLES
Myron G. Kelly, 75 Story Place, Alhambra, Calif., assignor of fifty percent to Raymond Blakeman, Los Angeles, Calif.
Filed Sept. 19, 1960, Ser. No. 56,758
6 Claims. (Cl. 339—242)

The invention relates to electrical connectors and has particular reference to a splice block which can be applied to a continuous bus cable without the necessity of breaking the cable and from which a substantially large number of lead-off cables can be connected in order to draw current from the bus cable.

In electrical installations for supplying relatively heavy amounts of power it is customary to employ heavily insulated bus cables of copper or some other acceptable material of sufficient capacity to bring heavy loads of current into an installation. Where an installation is somewhat extensive, as is often the case in a manufacturing facility, there are a number of stations where lead-off cables must be spliced to the bus cable. A common expedient has been to skin off the insulation from the bus cable and join to it a number of lead-off cables spaced one after another axially along the bus cable and in some instances on opposite sides where the lead-off cables are fastened, usually individually, either by twisting, soldering, brazing, or in some instances by use of individual clamps. After the attachment has been made it has been customary to wind the entire area with some appropriate insulating tape which of necessity must be of substantial thickness because of the heaviness of the current involved. The result has been a bulky and unwieldy splice often incapable of fitting into an appropriate gutter in which the bus cable is often carried. Further still, the time involved in building up splices of this kind has been prohibitive in view of the excessively high cost of electricians.

Some attempts have been made to provide splice blocks of a type fastened permanently in the gutter or other guideway for the bus but the permanent blocks heretofore used have been as bulky and cumbersome as the hand-made splices and have been rather limited in the number of lead-off connections possible. Where clamps have been employed, they too have been bulky and incapable in most instances of accommodating more than one or two lead-off cables. Not only has the problem of making up splices of this kind in the first instance been laborious and expensive, but on those occasions where one or more splice connections need to be disconnected and replaced by another, the entire installation often has to be removed from all of the connections and difficulty has been experienced in separating one lead-off connection from another without dislodging a number of connections which should remain permanent.

It is therefore among the objects of the invention to provide a new and improved lead-off splice block for continuous cables which can accommodate a relatively large number of lead-off cables and which is compact so as to provide a small finished package at the splice which can lie in the bottom of the gutter initially provided.

Another object of the invention is to provide a new and improved splice block for continuous cables which can be quickly and easily fastened into a portion of the cable from which a relatively minimum length of insulation has been removed and which, after having been secured in place in good electrical engagement, presents a quick and easy means of attaching a relatively large number of lead-off cables thereto which may vary considerably in the capacity one from another.

Still another object of the invention is to provide a new and improved splice block for continuous electrical bus cables which is compact and easy to apply to a short uncovered portion of cable and which is so constructed that the lead-off cables are connected into the splice block in an arrangement parallel to each other and to the bus cable, thereby to keep the splice connection compact and also to render it one easy to apply insulation thereto and subsequently to remove the insulation therefrom in the event some change might need to be made in one or more of the lead-off cables.

Still another object of the invention is to provide a new and improved lead-off splice block for continuous cables which is relatively simple to manufacture and which is so constructed that it can be equally well adopted to bus cables of different size and to lead-off cables of different sizes without any material change being made in the splice block, thereby providing a device not only economical of time and in first cost but also of such character that a relatively small number of separate sizes may comprise the entire inventory either in stock or on the job.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a side elevational view of the device in assembled condition with cables attached and insulation applied.

FIGURE 2 is a left end view partially broken away showing cables in place.

FIGURE 2(a) is a fragmentary end elevational view of an insulated splice block before cables are attached.

FIGURE 3 is a longitudinal sectional view taken on the line 3—3 of FIGURE 2.

FIGURE 9 is a perspective view of another modified form of the device partially broken away to reveal the means of attachment of cables.

FIGURE 10 is a longitudinal sectional view of another form of the invention for use with a discontinuous bus cable.

FIGURE 11 is a right end view of the device with cable connections shown in section taken on the line 11—11 of FIGURE 10.

Figure 4:
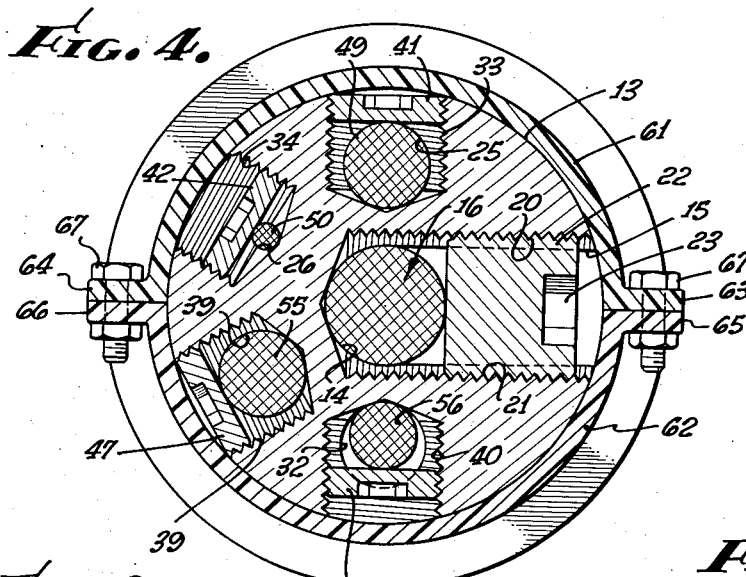
FIGURE 4 is a cross-sectional view taken on the line 4—4 of FIGURE 3.

In an embodiment of the invention chosen for the purpose of illustration there is shown a splice block constructed preferably of copper or some other equally appropriate good electrical conductor of sufficient mechanical strength to support and retain connections of relatively heavy electric cables. It is to be borne in mind that the splice block here involved is one especially adapted for power line work wherein cables may range in size from No. 14 wire up to a 1000 MCM bus cable or even greater and where the current and voltage is of a category customarily used in manufacturing establishments for operating heavy presses, lathes, milling machines and machine tools in general as well as furnaces, plating tanks and other equipment which customarily draws a heavy supply of electricity. In the drawing the splice block is indicated generally by the reference character 10 having opposite ends 11 and 12 and an intermediate exterior wall 13 which in the chosen embodiment is cylindrical. A central bore extends axially through the mid-portion of the body and opens through the opposite ends 11 and 12. It is important to note that there is provided a lateral opening forming an access passage 15 communicating with the central axial bore and opening through the exterior wall from one end to the other so that the splice block can be applied to a continuous cable without any necessity of cutting the cable. The central axial bore accommodates a bus cable indicated generally by the reference character 16 which, as is customary, comprises a metallic core 17 usually of copper and an insulating cover 18. When the bus cable is installed the insulation is skinned from a section 19 to bare the core, the skinned section preferably being kept to a length not much greater than the length of the body 10 from end to end. The block is then applied over the skinned section by passing the skinned section through the access passage to the bottom of the passage.

Figure 6:
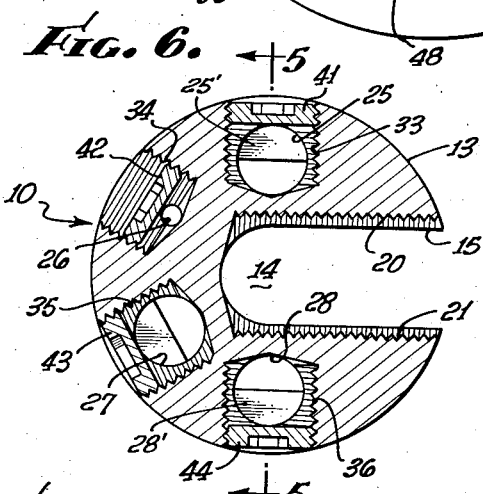
FIGURE 6 is a cross-sectional view taken on the line 6—6 of FIGURE 5.
Figure 5:
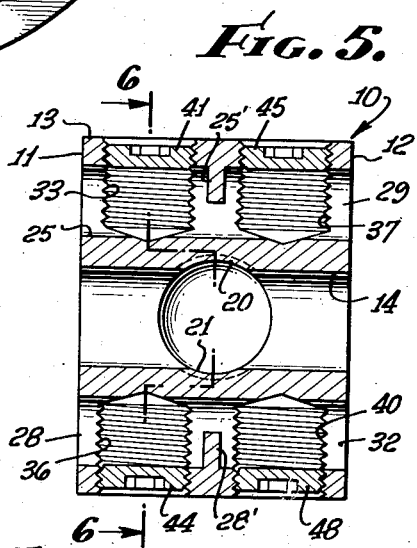
FIGURE 5 is a longitudinal sectional view taken on the line 5—5 of FIGURE 6 showing the splice block with cables removed.

In order to securely anchor the body of the splice block to the cable in a firm mechanical and electrical conducting connection, there are provided threaded portions 20 and 21 on opposite sides of the access passage, as shown in FIGURES 4 and 6, for reception of a threaded fastener plug 22 which is driven into place by the aid of a "Allen" head set screw 23. The plug for this particular fastening operation is preferably of some length to provide an ample degree of tightening and when applied is screwed into approximately the position shown in FIGURE 4 where it presses tightly upon the bus cable 16, forcing it into the bottom of the axial bore and pressing firmly upon it so as to establish ample contacting surfaces where electricity may flow from the cable to the splice block.

In order to accommodate the greatest variety of applications, it is needful to provide for attaching to the splice block a multiple number of lead-off cables which may be of various sizes, depending upon the units which are to be supplied with electric power. For this purpose the splice block chosen for the purpose of illustration contains eight lead-off cable bores, there being four bores entering the body from each of the respective ends 11 and 12. The lead-off cable bores entering the end 11 are shown as consisting of circular openings 25, 26 27 and 28. The lead-off bores at the opposite end 12 are numbered 29 and 32, the others being positioned in axial alignment with the bores 26 and 27 but not visible on the drawings.

The lead-off cable bores are provided respectively with treaded holes 33, 34, 35 and 36 adjacent the end 11 and 37, 39 and 40 adjacent the end 12, the remaining hole not being visible. In the holes are plugs 41, 42, 43 and 44, respectively, for the holes 33, 34, 35 and 36. Similarly the holes 37 and 40 are provided with plugs 45 and 48. The plugs are employed to fasten the lead-off cables in their respective bores making simultaneously a good mechanical and a good electrically conductive connection. As shown in the drawings, lead-off cables 49, 50, 51 and 52 are skinned of insulation at the ends to be joined and inserted respectively into the lead-off cable bores 25, 26, 27 and 28. The lead-off cables are pushed into the bores until they are stopped against a partition in each instance, there being illustrated a stop 25' within the bore 25 and a partition 28' within the bore 28, as shown in FIGURE 3. These same partitions also serve as stops, respectively, within the bores 29 and 32 which are in axial alignment with the bores 25 and 28.

In the same fashion lead-off cables 53, 54, 55 and 56 are prepared at the ends by removing the insulation and inserted respectively into the bores of the body at the end 12. In the drawings cables 53 and 56, respectively, are pictured as retained in the bores 29 and 32 by employment of the plugs 45 and 48.

The lead-off cables may vary considerably in size while still being accommodated by bores of substantially the same diameter. For example, the lead-off cable 53 is appreciably smaller in diameter than the lead-off cable 56 but both can be adequately retained and a sufficiently reliable connection made without the necessity of altering the size of the bore. Occasions, however, may make it advisable to provide bores of substantially smaller diameter where conditions indicate that small lead-off cables appreciably smaller than the bores may be made use of. The bore 26 is a much smaller bore and shown in this fashion as an example of the type of bore made reference to. In the interest of uniformity for manufacturing purpose and for the stocking of materials, the hole 34 and threaded plug 42 may be of the same size as the other holes even though the bore itself is of materially smaller diameter, since no measurable amount of material is saved by making the plug 42 smaller and cutting out a smaller amount of material from the body 10.

Although the drawing shows a lead-off cable mounted in each of the sundry bores provided, it will be appreciated that a lesser number of lead-off cables may be needed and used, depending on the requirements of a particular installation. As few as one or two such lead-off cables may be all that is necessary up to obviously eight in the specific embodiment shown. The structure is such, however, that even a greater number of bores may be provided for lead-off cables especially where the cables are of relatively small capacity. Where conditions may require, the entrances of the lead-off cable bores may be provided with knock-out discs (not shown).

In order to complete the installation, it is desirable and usually necessary to entirely insulate the splice block body and the exposed portions of the cables which are conducted into it. In the chosen embodiment there is shown an insulating jacket indicated generally by the reference character 60 and consisting of opposite matching sections 61 and 62. These sections are provided with fastening flanges as shown. For the section 61 fastening flanges 63 and 65 extend outwardly from end to end of the jacket and match respectively fastening flanges 64 and 66 of the section 62. The flanges are secured together by a series of bolts 67. In addition to the fastening flanges the section 62 is provided with semi-circular supporting flanges 68 and 69. These are complementary to similar semi-circular supporting flanges 70 and 71 on the section 61 so that when assembled the supporting flanges at the opposite ends present an annular form. As shown in FIGURE 1, the supporting flanges are designed to support the entire made-up assembly on the bottom of a gutter 72. In most installations cables of this kind lie in a supporting gutter of some appropriate kind fastened to the wall, ceiling or floor for housing the power cables. It is desirable both from the point of view of insulation and convenience to support the splice block at a distance from the bottom of the gutter in the manner shown.

To substantially complete the protection afforded by the insulating jacket, the section 62 is provided at opposite ends with end plates 73 and 74, respectively. Similarly the section 61 is provided with end plates 75 and 76. These end plates effectively close the opposite ends of the jacket in assembled condition except for such openings as may be provided for passage of the sundry cables. In the end plate 73, for example, are slots 77 and 78 which match in effect the locations of the bores 27 and 28 accommodating, respectively, the lead-off cables 51 and 52. Similarly there are provided slots 79 and 80 in the end plate 75 to accommodate, respectively, the bores 25 and 26 and the cables 49 and 50 which lead into those bores.

As an assurance against having open slots where no cables have been installed, slots 79 and 80, for example, may be provided with punch-out tabs 79' and 80', as shown in FIGURE 2a, defined by perforated edges 83 and 84. Similar knock-out tabs 77' and 78' in the end section 73 are defined by perforated edges 85 and 86. The knock-out tab 80', for example, may have a transverse perforation 87 permitting the tab to be only partially punched out in the event that no lead-off cable occupies the bore 25. It will be appreciated, however, that the lower portion of the knock-out tab 80' will need to be removed in order to accommodate the bus cable 16.

Figure 8:
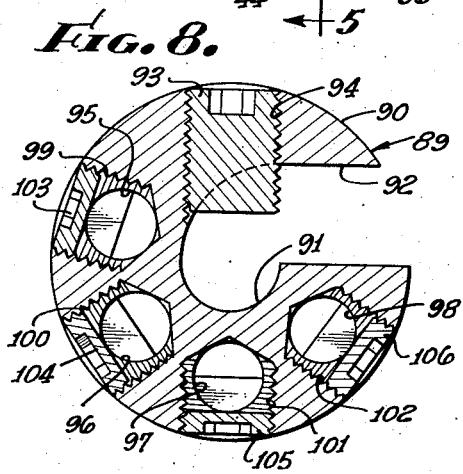
FIGURE 8 is a cross-sectional view of a modified form of splice block showing an alternative arrangement for reception of the bus cable.
Figure 7:
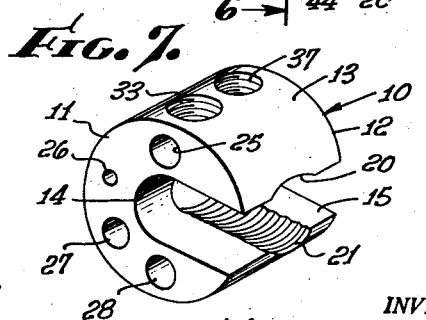
FIGURE 7 is a perspective view of the splice block alone.

In a second form of the invention illustrated in FIGURE 8 there is shown a body 89 defined in part by an external wall 90 through which extends an axial bore 91 to accommodate the bus cable. In this form an access passage 92 extends from end to end and communicates between the external wall 90 and the axial bore. The access passage is, however, curved at its junction with the axial bore so that the bus cable when in place, in effect, falls within a pocket. The cable is secured therein by employment of a threaded plug 93 which threadedly engages within a threaded hole 94, the plug being long enough to extend well past the access passage 92 and into the axial bore 91. Should the bus cable be of diameter appreciably smaller than the axial bore, the plug can be screwed far enough into it to securely fasten the splice block to the cable.

In this form of the invention, as in the first described form, there are provided a multiple number of lead-off cable bores exemplified at one end by the bores 95, 96, 97 and 98. Each of these is served by a threaded hole, these being identified respectively as holes 99, 100, 101 and 102 in which are located plugs 103, 104, 105 and 106 which serve the same purpose as the plugs heretofore described. The body formed in the fashion illustrated in connection with FIGURE 8 is one which can advantageously be used where an especially tight connection is desired upon the bus cable, since no amount of tightening upon the plug 93 will tend to spring the form of the body and the plug can always be mounted in the threaded hole during attachment of the splice block to the cable without necessity of removal at any time other than partial removal a distance sufficient to permit the bus cable to fall within the axial bore 91.

In still another form of the invention shown in FIGURE 9 there is provided a body 110 defined in part by an exterior wall 111 and through which extends an axial bore 112 from end to end. An access passage 113 also extends from end to end of the body and communicates between the exterior wall and the axial passage. The access passage is defined by walls 114 and 115 each provided with oppositely positioned longitudinally extending slots 116 and 117. These slots are receptive of a plate 118 somewhat narrower than the slots so that the plate can be slid freely into the slots from one end or the other after a bus cable 120 has been inserted. In this form of invention a threaded plug 119 is mounted in the plate 118 and when screwed into position against the bus cable forces the plate outwardly against outer walls of the slots as it is driven against the cable, while at the same time forcing the cable into the bottom of the axial bore. Removal is equally simple in that it requires no more than a loosening of the plug 119 sufficient to permit the plate to be slid endwise out of the slots, after which the bus cable 120 can be passed outwardly through the access passage 113. Here again sundry lead-off cable bores 121, 122, 123 and 124 are provided, these being preferably of various sizes to accommodate similarly sized lead-off cables 125, 126, 127 and 128 as shown. Again to enable the lead-off cables to be securely anchored in position, there are provided plugs 129, 130, 131 and 132 extending respectively into threaded holes 133, 134, 135 and 136. Although in all forms of the invention described the body has been shown as cylindrical, it will be appreciated that particular installations may dictate the provision of a body different in geometrical form without, however, departing from the spirit of the invention. Similarly also all forms of the invention contemplate provision of an insulating jacket substantially in conformance with the structure of the jacket described in detail in connection with the first described form of the invention.

In the form of invention shown in FIGURES 10 and 11 the connection is adapted for use at the free end of a main or bus cable 140. In this instance, a main bus cable bore 141 has a dead end 142 within the block providing a stop for the position of the cable. A threaded hole 143 accommodates a threaded plug 144 for securing the bus cable in contact position with the splice block 145.

In this instance, there is one series of lead-off cables 146, 147 running parallel to the main bus cable 140 at the same end 148 of the splice block. At the opposite end 149 is another series of lead-off cables 150, 151, 152, etc., which also lie parallel to the axis of the main bus cable 140.

In the instance of the lead-off cable 146 there is provided a cable bore 153 sufficiently large to accommodate a cable of this approximate size or smaller and extending transversely with respect thereto is a threaded hole 154 in which is a plug 155 for fastening the cable in position. Similarly a bore 156 accommodates the cable 147 and a plug 158 fitting in a thread hole 159 holds the cable 147 in position. Similarly on the opposite end a bore 160 accommodates the cable 150 and a plug 161 fitting into a threaded hole 162 is used for holding the cable and for the cable 152 a bore 163 is made use of in company with a plug 164 in a threaded hole 165. In this instance, there is provided at the center a lead-off cable bore 167 when full advantage is to be taken of all available space for accommodation of the cable 151. In this instance a relatively deep threaded hole 168 needs to be provided in which can be extended a plug 169. The block 145 as described is especially advantageous where the end of a bus bar is encountered since it accommodates a greater number of lead-off cables while at the same time preserving comparable advantages in that all of the lead-off cables lie parallel to the main bus cable and are connected in a compact arrangement as shown.

The invention herein described is one of extremely simple construction necessitating as shown relatively simple and inexpensive machining operations consisting primarily of drilling operations except in the instance of the cutting of the access passage. As a consequence the splice block is compact, simple, and at the same time inexpensive both to manufacture and to use and is moreover accompanied by provisions which make it adequately safe whenever occasions may be such that not all of the lead-off cable attachments are employed in a selected installation.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A splice fitting for splicing electric lead-off cables to a continuous electric bus cable comprising a block of electrically conducting material having opposite ends and a side wall intermediate the ends, said block having a bore therethrough, means forming in said block an access pasasge to said bore located laterally of the bore and extending from end to end thereof, an aperture extending from the bore laterally outwardly and exposed to the exterior of the block, and a fastener plug extending into the aperture to the bore to a location adapted to mechanically secure the bus cable in the block in an electrically conducting contact, means forming a plurality of lead-off cable bores in the block, and fastening means in the block extending from the exterior of the block to a location in said respective lead-off cable bores adapted to secure the lead-off cables in the block in an electrically conducting contact.

2. A splice fitting for splicing electric lead-off cables to a continuous electric bus cable comprising a block of electrically conducting material having opposite ends and a side wall intermediate the ends, said block having an axially extending bore therethrough from end to end, means forming in said block an access passage to said bore located laterally of the bore and extending from end to end thereof, a threaded aperture extending from the bore laterally outwardly and exposed to the exterior of the block, and a fastener plug extending threadedly into the aperture to the bore to a location adapted to mechanically secure the bus cable in the block in an electrically conducting contact, means forming a plurality of lead-off cable bores from at least one end of the block inwardly in positions substantially parallel to each other and to the bus cable, fastening means in the block extending from the exterior of the block to a location in said respective lead-off cable bores adapted to secure the lead-off cables in the block in an eccentrically conducting contact.

3. A splice fitting according to claim 2 in which said block is substantially cylindrical.

4. A splice fitting for splicing electric lead-off cables to a continuous electric bus cable comprising a block of electrically conducting material having opposite ends and a side wall portion intermediate the ends, said block having an axially extending bore therethrough from end to end, opposite walls forming an access passage through one side of the block from the side wall to the bore and extending from end to end for reception of a continuous electric bus cable, opposite threaded portions on the walls of said access passage and a threaded plug in engagement with said threaded portions adapted to be screwed into the access passage to a location adapted to engage the bus cable in a mechanical and electrical retaining contact, means forming a plurality of lead-off cable bores extending into the body from at least one end and having positions substantially parallel to each other and to the axially extending bore, means forming a hole extending from the exterior of the body into each respective lead-off cable bore and a fastening member in each hole adapted to secure a lead-off cable in said lead-off cable bore.

5. A splice fitting for splicing electric lead-off cables to a continuous electric bus cable comprising a block of electrically conducting material having opposite ends and a side wall portion intermediate the ends, said block having an axially extending bore therethrough from end to end, means forming an access passage through one side of the block from the side wall to the bore extending from end to end and offset with respect to said axial bore for reception of a continuous electric bus cable, means forming a threaded hole through the body from the exterior to the axially extending bore and a threaded plug in said hole adapted to be screwed in to a location adapted to engage the bus cable, means forming a plurality of lead-off cable bores extending into the body from at least one end and having positions substantially parallel to each other and to the axially extending bore, means forming a hole extending from the exterior of the body into each respective lead-off cable bore and a plug in each hole adapted to secure a respective lead-off cable in said lead-off cable bore.

6. A splice fitting for splicing electric lead-off cables to a continuous electric bus cable comprising a block of electrically conducting material having opposite ends and a side wall portion intermediate the ends, means forming opposite slideways in the body in the walls of said access passage and spaced from the opposite side of said axially extending bore, a slide bar in engagement with said slideways and a set screw in said slide bar adapted to be extended through the bar to a location adapted to engage said bus cable in mechanical and electrical retentive contact, means forming a plurality of lead-off cable bores extending into the body from at least one end and having positions substantially parallel to each other and to the axially extending bore, means forming a threaded hole extending from the exterior of the body into each respective lead-off cable bore and a threaded plug in each hole adapted to secure a respective lead-off cable in said lead-off cable bore.

References Cited in the file of this patent
UNITED STATES PATENTS

| | | |
|---|---|---|
| 1,978,932 | Cafiero | Oct. 30, 1934 |
| 2,935,550 | Gunthel | May 5, 1960 |